United States Patent

[11] 3,572,616

| [72] | Inventor | Harold Danford Ulisnik<br>Trumbull, Conn. |
|---|---|---|
| [21] | Appl. No. | 859,137 |
| [22] | Filed | Sept. 18, 1969 |
| [45] | Patented | Mar. 30, 1971 |
| [73] | Assignee | United Aircraft Corporation<br>East Hartford, Conn. |

[54] PITCH CONTROL MECHANISM FOR BLADED ROTOR
13 Claims, 9 Drawing Figs.

[52] U.S. Cl. .................................................. 244/17.23,
416/98, 416/130
[51] Int. Cl. ...................................................... B64c 27/10,
B64c 27/72
[50] Field of Search .......................................... 416/98,
112, 114, 116, 127, 130; 244/17.11, 17.13, 17.19,
17.23, 17.25

[56]  References Cited
UNITED STATES PATENTS
3,448,810   6/1969   Vogt.............................   416/127
FOREIGN PATENTS
591,982   9/1947   Great Britain................   416/98

*Primary Examiner*—Milton Buchler
*Assistant Examiner*—Paul E. Sauberer
*Attorney*—Vernon F. Hauschild ABSTRACT: Two Z-crank mechanisms connect at different stations to a rotor swashplate so that translation of the mechanisms causes collective pitch variation of the blades and so that rotation of the mechanisms either together or separately causes cyclic pitch variations of the blades.

Patented March 30, 1971

INVENTOR
HAROLD DANFORD ULISNIK
BY Vernon F. Hauschild
ATTORNEY

Patented March 30, 1971

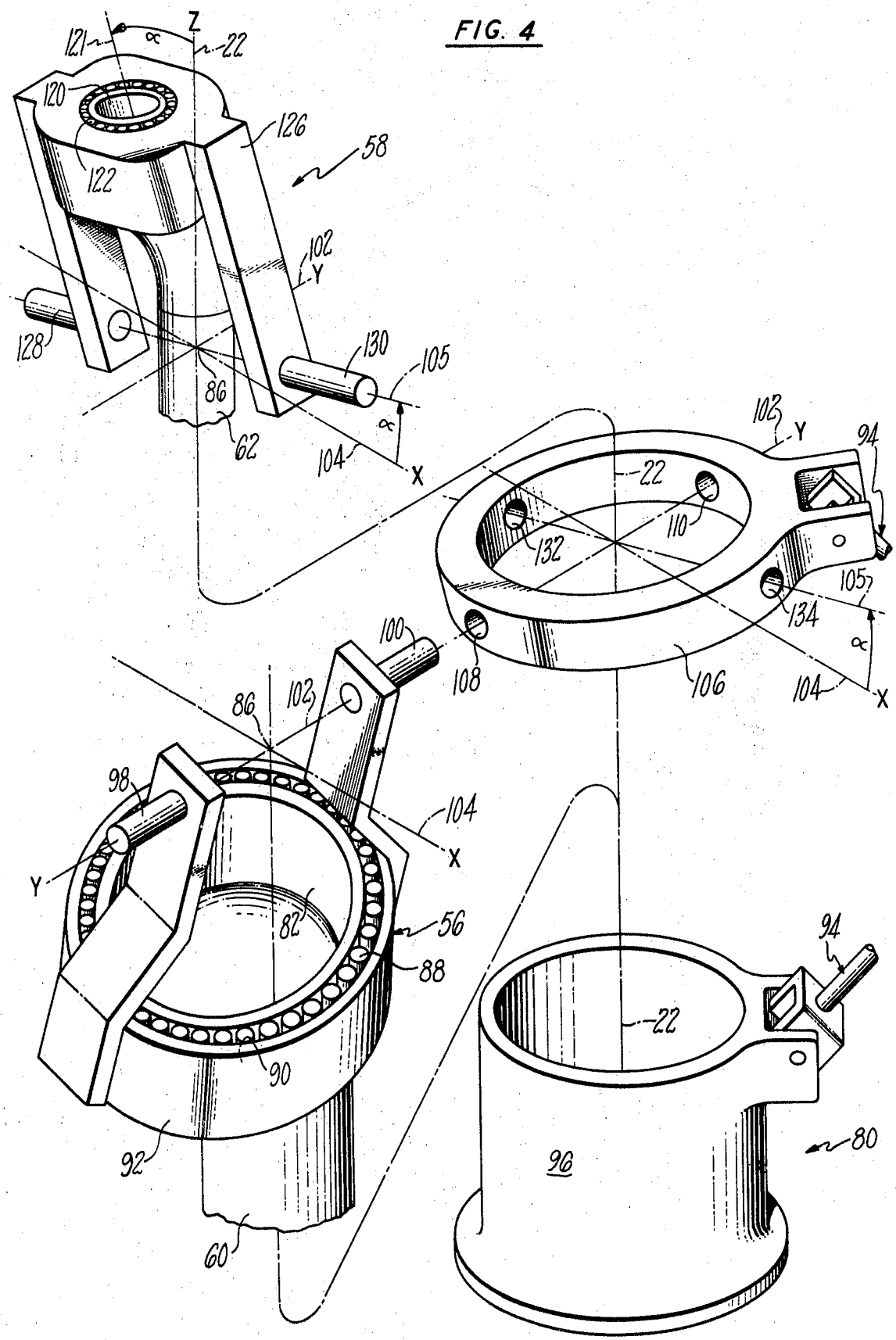

Patented March 30, 1971 3,572,616

PITCH CONTROL MECHANISM FOR BLADED ROTOR

CROSS-REFERENCE TO RELATED APPLICATIONS

A related application Ser. No. 859,093 was filed on even date in the name of Arthur Linden entitled "Pitch Control Mechanism For Bladed Rotor" which specifically claims the subject matter of FIGS. 4 and 5 herein.

BACKGROUND OF THE INVENTION

1. Field of Invention

This invention relates to mechanism for varying the pitch of blades on a rotor and more particularly to varying the pitch both cyclically about any selected axis and collectively.

2. Description of the Prior Art

In the rotor blade pitch change art, it is a unique requirement of the helicopter rotor that the blades be capable of pitch change both collectively and cyclically to effect proper aircraft control in pitch, roll and yaw. In the past this has been accomplished by supporting the rotor on a mast projecting from the fuselage and utilizing a swashplate external of the mast which is connected to the blade pitch horns by connecting rods and which is actuatable by a plurality of hydraulic cylinder-piston arrangements so that swashplate translation effects collective pitch change of the blades and swashplate tilt effects cyclic pitch change of the blades. With this arrangement all of the pitch change mechanism is positioned external of the rotor mast thereby producing substantial drag. This prior art construction is shown in U.S. Pat. No. 3,199,601. In addition in a coaxial rotor system control of the upper rotor is difficult to achieve without excessive mechanical complexity, especially when the upper rotor control must be independent from the lower rotor control.

Whenever the term, "inner rotor" appears in the specification, it identifies that rotor which is closer to the fuselage, whereas the term, "outer rotor" identifies that rotor which is outboard or farther from the fuselage than the "inner rotor."

Another approach in controlling helicopter-type aircraft was taught in the Cierva Air Horse described fully in the Apr. 8, 1949, issue of "The Aeroplane." In this construction, three helicopter lift rotors were used, two of them offset from the longitudinal centerline of the fuselage at the forward end of the aircraft and one of them positioned along the longitudinal centerline at the rear of the aircraft. In the Air Horse, aircraft pitch and roll are controlled by blade collective pitch variation only. Cyclic pitch is used solely for yaw control and a single Z-crank mechanism is utilized to produce cyclic pitch variation about a single axis of the rotor to effect yaw control. It would be impossible with this construction to obtain cyclic pitch variation about any other axis than the single selected axis.

Single Z-cranks have been used elsewhere, such as in U.S. Pat. Nos. 1,750,778 and 2,333,366 to vary blade pitch. In these constructions, however, the single Z-crank is located in the blade of the helicopter and therefore adds to the rotor profile and serves to permit blade pitch variation about a single axis only.

U.S. Pat. Nos. 2,097,117 and 2,097,118 use a single Z-crank arrangement to tilt the entire drive system of a rotor about a single axis. Such a system requires powerful, heavy and complicated actuating mechanisms and is therefore not desirable.

U.S. Pat. No. 2,651,480 to Pullin, which bears a striking resemblance in construction to the aforementioned Cierva Air Horse, utilizes a single Z-crank to effect cyclic pitch variation about a single axis as in the Air Horse; and, while he utilizes a second Z-crank, this second Z-crank is utilized solely to cause the first Z-crank to translate to effect collective pitch variation.

It will accordingly be seen that Z-crank mechanisms have not been used in helicopter rotors to produce cyclic pitch variation about any selected axis and to also produce collective pitch. In constructions which were capable of accomplishing these functions, such as those described above in connection with U.S. Pat. No. 3,199,601, pitch control mechanism generally had to be utilized external of the rotorhead, thereby adding to the frontal area and drag created by the rotor in operation.

In the past, the controlling of blade pitch on concentric counterrotating rotors has presented a particularly troublesome problem which could not be met by the use of conventional external swashplate mechanisms. To solve this problem, double swashplates had to be used with the first swashplate positioned below the inner or lower rotor and controlling the inner rotor pitch and with the second swashplate positioned between the two rotors and controlling the outer or upper rotor pitch, both swashplates and related mechanisms being external of the rotor drive shafts. While it is conventional to make a swashplate of the rotatable-stationary member construction, in this construction, it would be necessary to make the swashplate for the outer rotor to include two rotatable members to account for counterrotation of the blades. This, of course, is a highly complicated system, presents substantial frontal area, large diameter and drag creating mechanisms and also has the disadvantage that identical pitch change variations have to be made to both rotors and therefore the rotors could not be controlled independently.

Attempts have been made to effect independent control of two concentric rotors by passing the control servos for the outer rotor through the outer rotor drive shaft to the swashplate which was positioned within the outer rotor drive shaft, however, this proved unsuccessful because it required that the outer rotor drive shaft be of an objectionably large diameter. This, in turn, required the inner rotor drive shaft to be even larger in diameter and both of these enlarged diameter drive shafts required transmission design compromise to accommodate connection to such large drive shafts with the attendant mechanical complication and added weight.

SUMMARY OF THE INVENTION

A primary object of the present invention is to provide a pitch control mechanism for the blades of a helicopter which is capable of varying blade pitch cyclically about any selected axis and which is also capable of varying the blade pitch collectively and which produces a rotorhead of minimum frontal area and drag.

In accordance with the present invention, a rotor construction of minimum height can be achieved utilizing the invention.

In accordance with the present invention, the blade pitch control mechanism is located internally of the rotor drive mechanism.

In accordance with a further aspect of the present invention, the pitch control system taught herein can be used with either a single rotor or concentric double rotors and with the pitch control swashplate positioned in the rotor hub and with the swashplate control mechanisms passing through the rotor drive shaft, which is of minimum diameter since the swashplate is not positioned therein but in the rotor hub and is connected directly to pitch change horns projecting from the inner end of the blades into the hub, thereby providing a rotor system of minimum diameter, and having no externally positioned pitch control mechanisms to create drag.

In accordance with a further aspect of the present invention, two Z-crank systems, which include two concentrically mounted torque tubes as the central legs of each Z, are connected at different stations to the nonrotating portion of a swashplate so that translation of the torque tubes will effect collective pitch change of the blades and so that selective rotation of the torque tubes will produce universal cyclic pitch variation of the rotor blades about any selected axis.

In accordance with a further aspect of the invention, the first Z-crank arrangement permits cyclic pitch variation about an axis which is 90° to the axis about which the second Z-crank arrangement permits cyclic pitch variation so that coaction of the two Z-crank mechanisms produces superimposed cyclic pitch variations to permit cyclic pitch control about any selected axis and to also produce collective pitch control, and wherein these axes may be parallel to the aircraft longitudinal and lateral axes.

This invention can be used either to so control the pitch of a single rotor or to control the pitch of multirotor aircraft and the particular pitch control system can be used to control one or both rotors or can be used in combination with another pitch control system to control one of the rotors only while the other pitch control system controls the pitch of the other rotor. In accordance with another feature of this invention, the pitch of the concentric rotors can be controlled independently of one another.

In accordance with another feature of this invention, the double Z-crank pitch control mechanism can be located outboard of the rotor so as to permit the rotor to be positioned immediately adjacent the transmission system which drives the rotor, thereby permitting the use of short drive shafts between the transmission system and the rotorhead and producing a rotor of minimum height.

Another feature of the present invention is that by proper selection of the angle between the bearing axis and the torque tube axis of a given Z-crank system, the amount of torque tube rotation required to effect a given amount of tilt of the control lever axis and swashplate and hence cyclic pitch variation can be readily controlled.

BRIEF DESCRIPTION OF THE DRAWINGS

FIG. 4 is a perspective exploded showing of a double Z-crank mechanism.

DESCRIPTION OF THE PREFERRED EMBODIMENT

Figure 1:
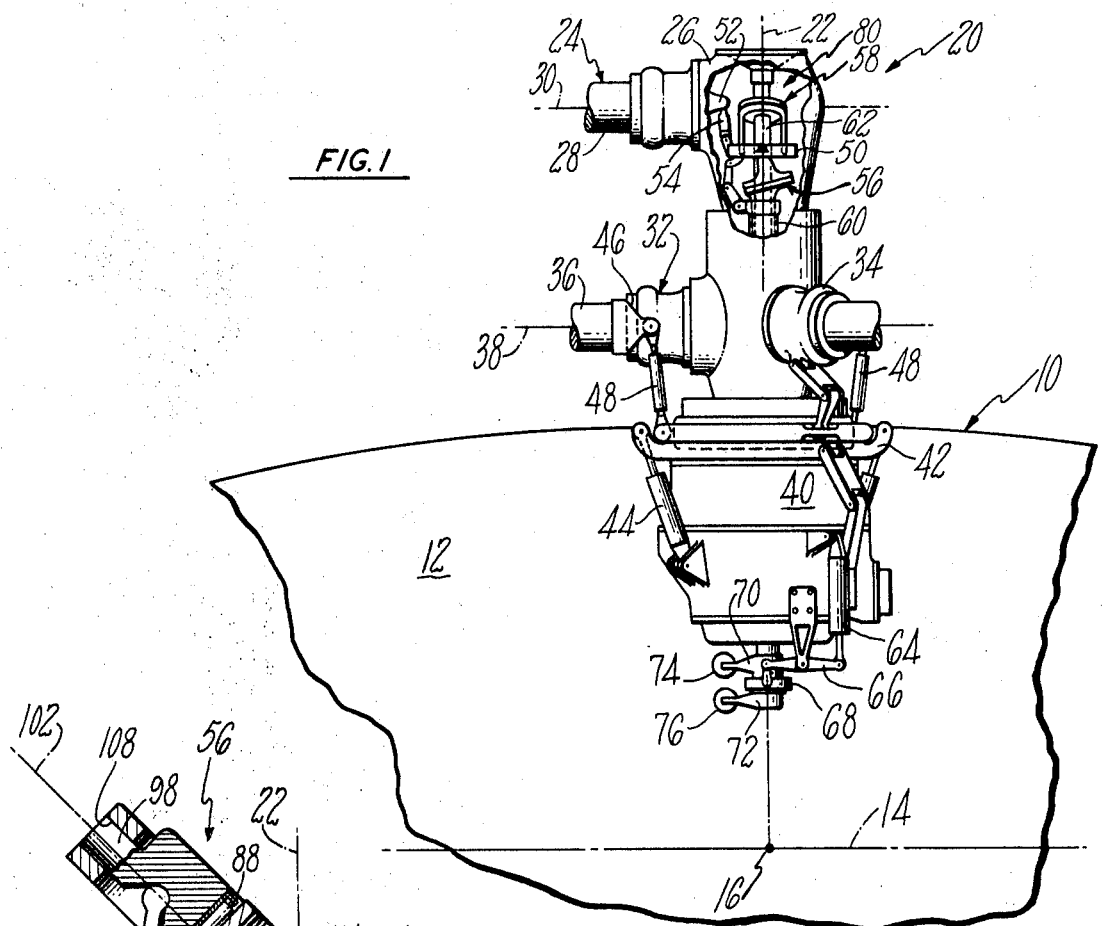
FIG. 1 is a showing of a portion of a modern aircraft, such as a helicopter, with a coaxial, counterrotating rotor mechanism projecting therefrom and shown to be partially broken away to reveal the environment in this environment.

Referring to FIG. 1 we see modern aircraft 10 of the helicopter type which includes fuselage 12 and which has longitudinal axis 14 with lateral axis 16 projecting perpendicular thereto into and out of the plane of the drawing. Rotor assembly 20 is supported from within fuselage 12 and projects outwardly therefrom to be rotatable about axis of rotation 22. Rotor assembly 20 is illustrated as a concentric, counterrotating unit including outer rotor assembly 24, including hub 26 mounted for rotation about axis 22 and including a plurality of blades 28 projecting therefrom for rotation therewith and supported therefrom for pitch change motion about feathering axis 30. Rotor assembly 20 also includes inner rotor assembly 32, which is mounted for rotation about axis 22 and which includes rotor hub 34 and includes a plurality of blades 36 mounted therefrom for rotation therewith and for pitch change motion with respect thereto about feathering axis 38.

Rotor assembly 20 is supported from fuselage 12 by transmission assembly 40 and rotors 24 and 32 are driven thereby in a fashion to be described in greater particularlity hereinafter.

Aircraft 10 and rotors 24 and 32 may be of the type more particularly disclosed and described in U.S. Pat. No. 3,409,249 with blades 28 and 36 of the type more particularly described in U.S. Pat. No. 2,657,754.

The blades 36 of rotor assembly 32 are caused to change pitch in conventional fashion by swashplate mechanism 42, which is caused to translate along and tilt with respect to axis 22 by a plurality of selectively controlled servomechanisms 44. Swashplate 42 is connected to pitch horn 46 of each blade 36 by pitch control rod 48 that is operated in conventional fashion so that translation of swashplate 42 causes collective pitch change variation and tilt action of swashplate 42 causes cyclic pitch variation of the blades of rotor 32. This pitch change mechanism for rotor 32 is described in greater particularity in U.S. Pat. No. 3,199,601.

The invention herein relates to the way that the pitch of blades 28 of rotor 24 is controlled and the rotor assembly 20 of FIG. 1 is partially broken away to permit a general showing of this construction. Blades 28 of rotor 24 are controlled in pitch by swashplate 50 which is connected to pitch change horns 52 at the inner ends of blades 28 by pitch control rod 54 so that translation of swashplate 50 along axis 22 will cause collective pitch variation of the blades 28 of rotor 24 and tilting action of swashplate 50 with respect to axis 22 will cause cyclic pitch variation of blades 28. The position and motion of swashplate 50 is controlled by first Z-crank mechanism 56 and second Z-crank mechanism 58, which will both be described in greater particularity hereinafter, and which are supported from concentric torque tubes 60 and 62. Torque tubes 60 and 62 are caused to translate along axis 22 by servo pistoncylinder mechanism 64, which connects through swivel link 66 to bearing 68, which is in turn connected to the torque tubes through link members 70 and 72. This translatory motion of the torque tubes imparts a similar motion to swashplate 50 and a collective pitch change to blades 28. The torque tubes 60 and 62 can be caused to rotate with respect to axis 22, in unison or separately by cylinder piston servomechanisms 74 and 76, which are connected to tubes 60 and 62, respectively, through crank elements 70 and 72 to cause the rotary motion thereof and thereby establish tilt motion in swashplate 50 to control the cyclic pitch of blades 28 of rotor 24.

For a full appreciation of the operation of pitch control mechanism 80 of blades 28, which includes two Z-crank mechanisms 56 and 58, it is deemed desirable to first consider the operation of a single Z-crank mechanism and reference will now be made to FIG. 2. In this connection, wherever possible, for purposes of continuity, the same reference numerals will be used in describing the FIG. 2 construction as were used in describing the FIG. 1 embodiment. For purposes of clarity, an angle of about 45° is illustrated in FIG. 2 between the bearing axis 84 and the torque tube axis 22, but it should be borne in mind that in practice this angle is actually much smaller and in the vicinity of about 10°.

The first Z-crank mechanism 56 includes torque tube 60 which is positioned concentrically about torque tube axis 22. Torque tube 60 constitutes the central leg of the Z-crank mechanism and connects to one of the end legs thereof; namely, tube or cylindrical portion 82 which is concentric about bearing axis 84, which intersects axis 22 at point of intersection 86 and which forms an angle therewith as do the legs of a Z. Ring bearing 88 is sleeved onto the outer diameter of member 82 and engages the inner cylindrical aperture 90 of control lever 92 so that control lever 92 is supported from torque tube 60 and member 82 so as to permit relative rotation between member 82 and control lever 92. End pins 98 and 100 project from opposite ends of control lever 92 and are concentric about control lever axis 102, which passes through point of intersection 86.

Stationary scissors 94 connect control lever 92 to fixed standpipe 96 to prevent rotation of the control lever but to permit tilting thereof and relative motion rotation of cylindrical member 82 therewithin so that, as torque tube 60 is caused to rotate about axis 22 by crank 70, member 82 will be caused to rotate within control lever 92. Since control lever 92 is restrained from rotating therewith by stationary scissors 94, control lever 92 is thereby caused to tilt or pivot about tilt axis 104, which intersects point of intersection 86 and is perpendicular to the plane of the paper shown in FIG. and to axes 102, 22, and 84. In practice, a wobble ring, which is actually the nonrotating ring 106 of swashplate 50 is supported by control lever 92 since end pins 98 and 100 are received in apertures 108 and 110 thereof. And accordingly, ring 106, if restrained from rotation about axis 102, will tilt with control lever 92 about tilt axis 104.

Figure 2:
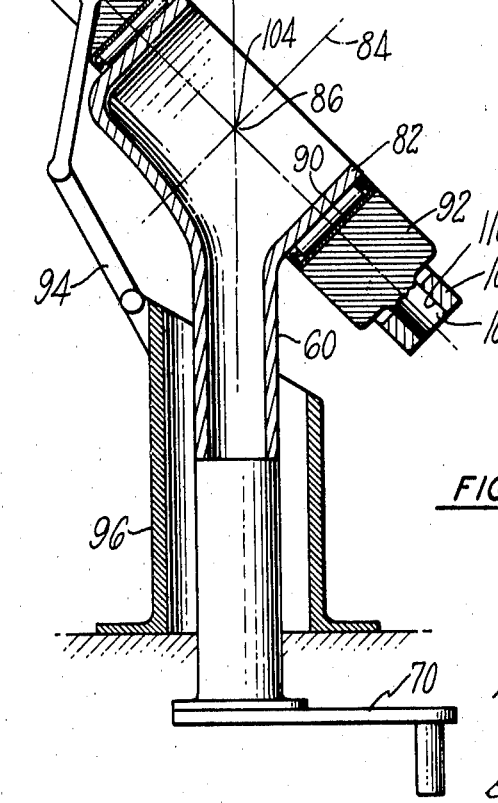
FIG. 2 is a schematic showing of a single Z-crank mechanism to be utilized to demonstrate the operation of such a mechanism.

Actually, in our pitch control mechanism 80, a second Z-crank mechanism 58 is used with mechanism 56 shown schematically in FIG. 2 and includes comparable mechanism to cause swashplate nonrotatable ring 106 to also be pivotable or tiltable about axis 102, which is perpendicular to axis 104. Axes 102 and 104 are orthogonal.

Figure 3:
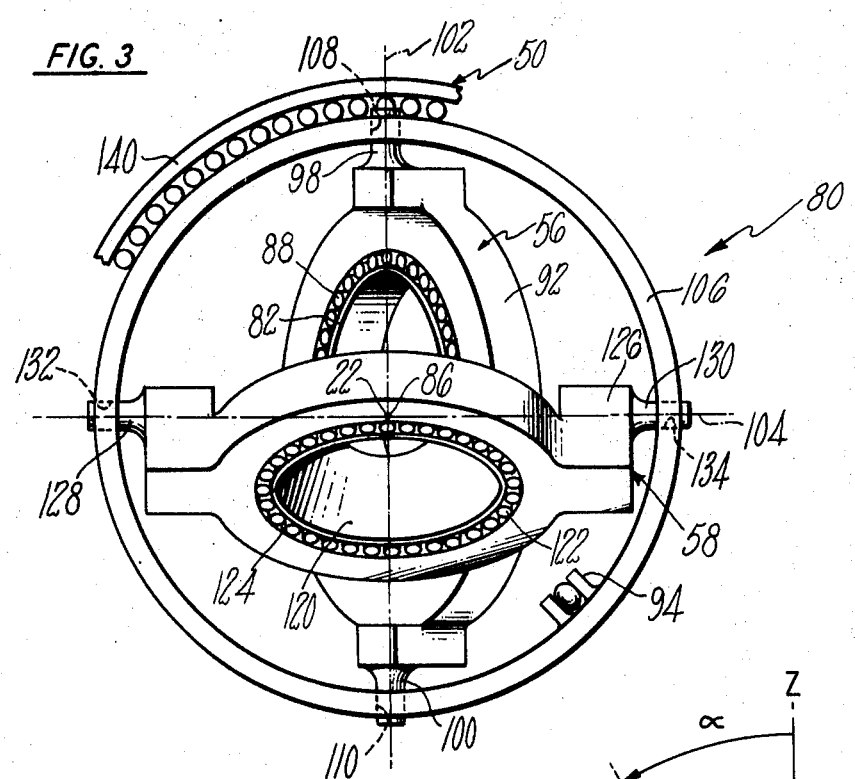
FIG. 3 is a top view of the double Z-crank mechanism of this invention supporting the swashplate of a rotor pitch control system.

A top view of such a double Z-crank arrangement is shown in FIG. 3. The same reference numerals used to identify the parts of first Z-crank mechanism 56 in FIG. 2 are also used in FIG. 3 and the mechanism of the second Z-crank mechanism 58 will now be described. Tube member 120 is of circular cross section and concentric about a second bearing axis 121 passing through point of intersection 86 and constitutes a first leg of the Z of the second Z-crank mechanism 58, which forms an angle with and projects from torque tube 62 in the same fashion that corresponding cylindrical mechanism 82 projects from torque tube 60 in FIG. 2. Ring bearing 122 is sleeved onto member 120 and received in the cylindrical inner aperture 124 of the second control lever 126 so that control lever 126 is supported from central member 120 and relative rotation therebetween is permitted. End pins 128 and 130 project from the opposite ends of control lever 126 and are concentric about axis 104 which is the control lever axis for Z-crank mechanism 58 and, also, the tilt axis of Z-crank mechanism 56. End pins 128 and 130 pass through apertures 132 and 134 in nonrotating swashplate ring 106, which apertures are in diametrical alignment with one another and positioned 90° from the diametrically aligned apertures 108 and 110, which receive end pins 98 and 100 of the first Z-crank mechanism 56. Stationary scissors 94 is shown connected to ring 106 in FIG. 3 but is obvious that it could as well be connected to control levers 92 or 126 since it performs the function of preventing these three elements from rotating about axis 22.

With the mechanism of FIG. 3 just described it will be evident that with swashplate ring 106 restrained from rotation, the rotation of torque tube 60 will cause swashplate 50 to tilt about axis 104 and rotation of torque tube 62 will cause swashplate 50 to tilt about axis 102. This tilting action will be imparted to swashplate rotary member 140 and therefrom by connecting rods such as 54 (FIG. 1) to a pitch change horn 52 at the inner ends of each blade 28 to cause pitch variation thereof.

We have illustrated a construction in FIG. 3 in which the swashplate 50 is tiltable about perpendicular axes 102 and 104.

Figure 5:
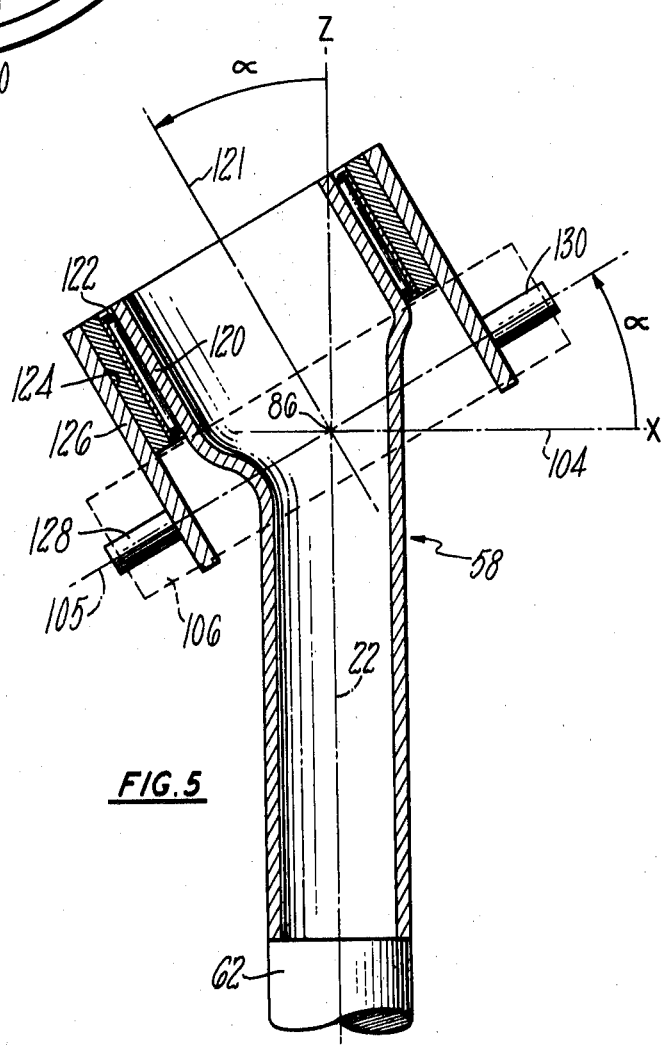
FIG. 5 is a partial side view of the FIG. 4 construction showing the outer or upper Z-crank connection to the swashplate.
Figure 6:
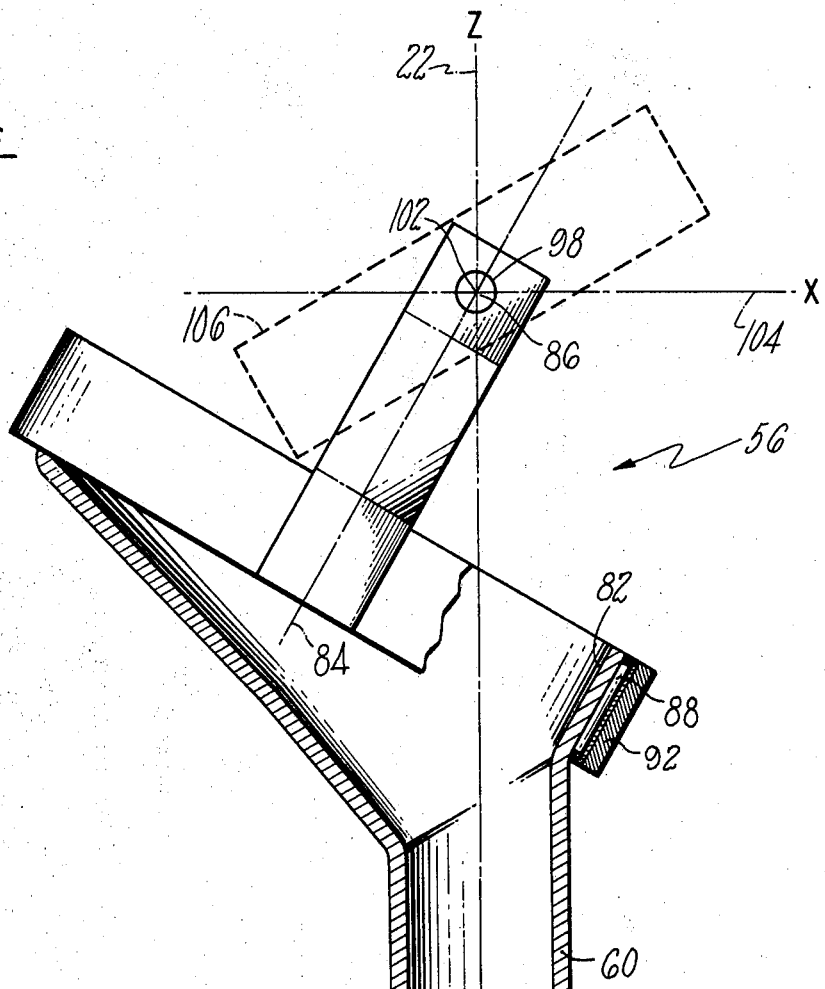
FIG. 6 is a partial side view of the FIG. 4 construction showing the inner or lower Z-crank connection to the swashplate.

Now referring to FIGS. 4 through 6, we see an exploded view and sections thereof of a double Z-crank mechanism system 80 imparting cyclic pitch variations to the stationary member 106 of the rotor swashplate wherein the lower Z-crank mechanism 56 is shown producing a 0° cyclic pitch input and the upper or outer Z-crank mechanism 58 is shown imparting a cyclic input of angle $\alpha$. FIG. 4 shows that torque tube 60 of Z-crank mechanism 56, torque tube supporting standpipe 96, swashplate nonrotating ring 106, and torque tube 62 of Z-crank mechanism 58 are positioned concentrically about rotor axis of rotation and torque tube axis of rotation 22. Stationary scissors 94 projects between fixed standpipe 96 and swashplate nonrotating ring 106 to prevent rotation of ring 106 about axis 22, while permitting tilting action thereof in conventional fashion. Viewing the bottom portion of FIG. 4 and FIG. 6 it will be seen that Z-crank mechanism 56 includes torque tube 60 which is concentric about axis 22 and which includes a first end 82 which is of circular cross section and concentric about bearing axis 84 which forms an angle with axis 82 and defines point of intersection 86 therewith. Ring bearing 88 is received onto the outer surface of sleeve 82 and in turn receives control lever 92 outwardly thereof to permit relative rotation between members 82 and 92. Control lever 92, as will be shown in greater particularity hereinafter, will be positioned below ring 106 and therefore projects in any convenient fashion upwardly from bearing support tube 82 so as to support end pins 98 and 100 in spaced relation therefrom and concentrically about control lever axis 102. Since pins 98 and 100 are received in apertures 108 and 110 of swashplate nonrotating ring 106, it will be seen that Z-crank mechanism 56 performs the function supporting ring 106 for tilt motion about axis 102, which is preferably parallel to the aircraft longitudinal axis and perpendicular to the aircraft lateral axis or vice versa. Further viewing of these FIGS. shows that in Z-crank mechanism 56 axes 84, 22, and 102 intersect at point 86.

Now viewing the upper portion of FIG. 4 and FIG. 5, we see Z-crank mechanism 58 consisting of torque tube 62 positioned concentrically about axis 22 and having bearing support sleeve 120 projecting therefrom at angle $\alpha$ so that bearing support tube 120 is concentric about bearing axis 121. Ring bearing 122 supports control lever 126 from sleeve 120 and concentrically about axis 121 and, since Z-crank mechanism 58 is going to be positioned above ring 106, as shown in greater particularity hereinafter, control lever 126 is shaped in any convenient fashion to project downwardly so as to support end pins 128 and 130 concentrically about control lever axis 105, which in view of the cyclic control input illustrated in these FIGS. to the Z-crank mechanism 58, is angularly offset with respect to axis 104 by angle $\alpha$ and is orthogonal with axis 102. It will be noted that in Z-crank mechanism 58, as in the previously described mechanism 56, bearing axis 121, control lever axis 105 and axis of rotation 22 intersect at point 86 which, is the common point of intersection for the comparable axes of Z-crank mechanism 56 and this axis intersection is necessary to permit the offset relationship between swashplate ring 106 and the bearings and bearing support ends of Z-crank members 56 and 58 on opposite sides thereof to permit the fabrication of a minimum diameter rotor assembly 80.

FIGS. 4—6 show that the coaction of Z-crank mechanisms 56 and 58 is to support swashplate nonrotating ring 106 to be tiltable about axis 102, since there is zero cyclic input to Z-crank mechanism 56, and about axis 105, which is angularly offset from axis 104 by the amount of cyclic pitch input being imparted to the rotor by Z-crank mechanism 58, namely angle $\alpha$. Axes 102 and 104 are the axes of zero cyclic pitch input and are preferably positioned 90° apart for optimum results since any deviation therefrom would cause undesirable feedbacks from one of the Z-crank mechanism to the other.

Figure 7:
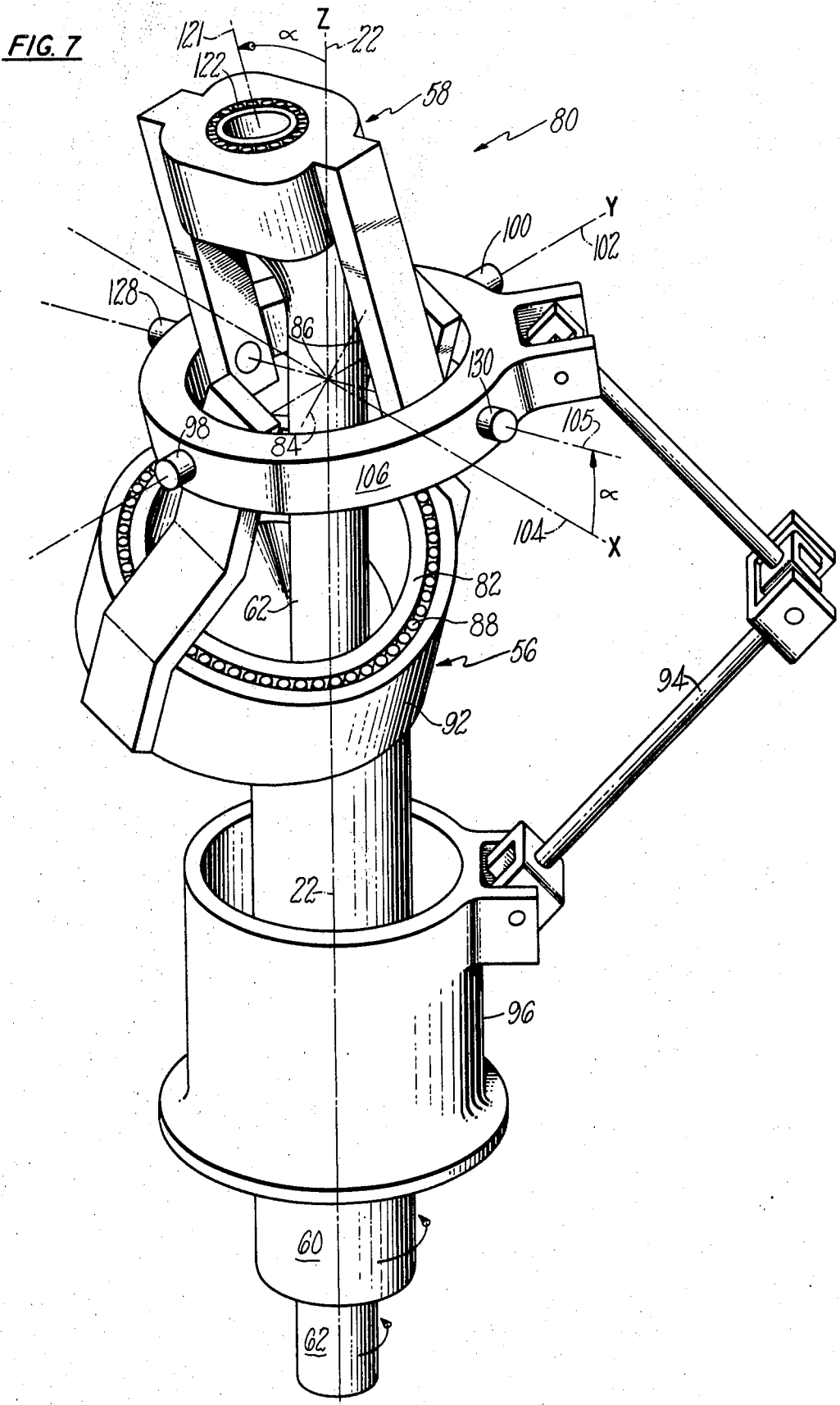
FIG. 7 is a perspective showing of this pitch control system in a coaxial, counterrotating rotor system.

Now referring to FIG. 7 we see the double Z-crank pitch control system 80 which has just been described in connection with FIGS. 4—6 in its assembled condition. It will be noted therefrom that fixed standpipe 96, and torque tubes 60 and 62, as well as ring 106, are positioned concentrically about axis of rotation 22 and that Z-crank mechanisms 56 and 58 are positioned on the opposite sides of ring 106 along axis 22, thereby permitting the pitch control mechanism 80 of FIG. 7 to be of a lesser diameter than would have to be the case if Z-crank mechanisms 56 and 58 were in substantially radial alignment with ring 106 and its associated swashplate parts. The plane of axes 102 and 104 is the plane of swashplate nonrotating ring 106 when there is zero cyclic pitch input to the rotor blades and it is important to note that the axis of rotation 22, the bearing axes 84 and 121, and the control lever axes 102 and 105 of Z-crank mechanisms 56 and 58, respectively, together with axis 104, all pass through common point of intersection 86. By viewing FIG. 7 it will be evident that by rotating torque tube 62 about axis 22, Z-crank mechanism 58 will cause swashplate ring 106 to tilt about axis 102, which is the zero cyclic pitch input axis for this Z-crank mechanism, and that rotation of torque tube 60 of Z-crank mechanism 56 will cause swashplate ring 106 to tilt about axis 105, which is offset from the zero cyclic pitch input axis 104 by the amount of cyclic pitch imparted to ring 106, namely angle α. It will also be evident that by simultaneous and selective rotation of torque tubes 60 and 62, ring 106, due to the superimposed action thereon of Z-cranks 56 and 58 can be brought to tilt about any arbitrary axis so that mechanism 80 is universal in nature in this respect and can produce any desired cyclic pitch.

Figure 8:
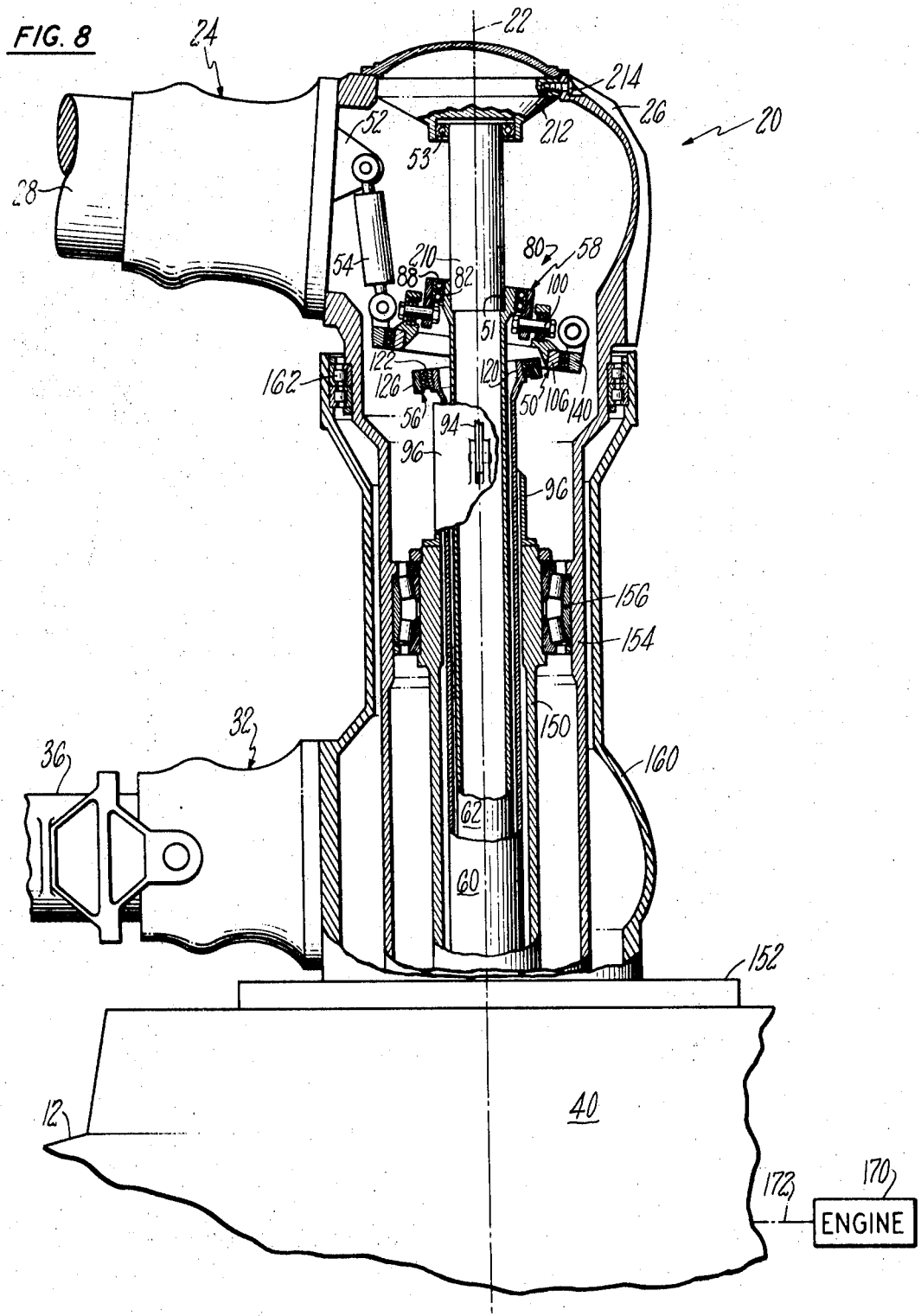
FIG. 8 is a cross-sectional showing of a coaxial counterrotating rotor system utilizing the invention and broken away to illustrate the invention in this environment and its drive mechanism.

Now referring to FIG. 8 we see a side cross-sectional view of rotor assembly 20 shown in greater particularity than in FIG. 1. It will be noted that torque tube 62 of Z-crank assembly 58 is positioned concentrically about axis 22 and within torque tube 60 of Z-crank assembly 56, which is in turn positioned within cylindrical standpipe 96. Standpipe 96 is supported by cylindrical support 150, which is received in mating relation at the base thereof in fixed transmission housing 152. Rotor drive shaft 154 for outer or upper rotor 24 is of circular cross section and concentric about axis 22 and supported from central cylindrical support 150 by bearing assembly 156. Lower or inner rotor drive shaft 160 is supported form upper rotor drive shaft 154 by bearing unit 162.

Rotor assembly 20 is driven by engine 170, which may be of any conventional type such as that taught in U.S. Pat. Nos. 2,711,631 and 2,747,367, through transmission 40. Appropriate drive mechanism of a conventional nature 172 connects engine 170 in driving relation to transmission 40 of the type shown in U.S. Pat. No. 2,522,443 to drive rotors 24 and 32 in opposite directions.

The upper end of torque tube 62 is supported by cylindrical support member 210 which projects into and is splined to inner cylindrical surface 51 of first end 82 of torque tube 62 such that it is rotatable with and axially displaceable with respect to torque tube 62 about axis 22. Support member 210 is supported from hub 26 by flange member 212 through bearing 53 which permits relative rotations between flange 212 and support member 210.

Figure 9:
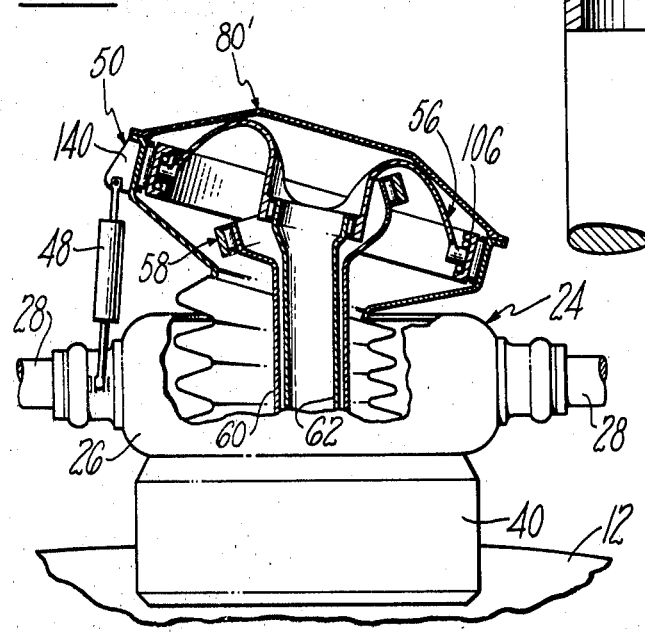
FIG. 9 is a side view of a modification of the pitch control system used on a single rotor and utilizing a different helicopter environment.

While the construction shown so far has the advantage that the entire pitch control mechanism 80 for outer rotor 24 can be carried inwardly of the drive shaft mechanisms 160 and 154 and thereby permit the use of a construction which is of a lesser diameter about axis 22, than would be the case if conventional pitch control means such as the hydraulic cylinders 48 of rotor 32 were used therewith, other constructions are possible. For example, in the construction shown in FIG. 9, the control mechanism 80' for a single rotor helicopter is positioned outwardly of the helicopter rotor 24 which is, in turn, positioned immediately adjacent transmission 40 of the type described in connection with FIG. 8. In this construction, swashplate 50, and the ends of Z-crank mechanisms 56 and 58 which connect thereto are substantially in radial alignment and therefore a construction of minimum height projecting from fuselage 12 is achieved. Such a construction permits the use of short drive shafts between the transmission 40 and the rotor 24 but does not permit the pitch control mechanism rods 48 which extend between swashplate 50 and blades 28 to be positioned within the rotor hub 26. Pitch control mechanism 80' is otherwise similar to that shown and described in connection with FIG. 8 and the same reference numerals have been imparted thereto for identification purposes.

I claim:

1. A pitch control system for a helicopter rotor having a plurality of blades mounted for rotation and blade pitch variation including:

a. a first torque tube mounted for rotation about an axis of rotation and having a first end of circular cross section positioned concentrically about a first bearing axis which forms an angle with and intersects said axis of rotation to define a point of intersection therewith;

b. a first bearing member enveloping said first end of said first torque tube and positioned concentrically about said first bearing axis;

c. a first control lever including a circular central portion concentrically enveloping said bearing member to be supported therefrom by said first end of said first torque tube and so as to permit rotation therebetween and including end pins projecting from opposite sides thereof concentrically about a first control lever axis passing through said point of intersection;

d. a swashplate nonrotating ring including two sets of diametrically opposed apertures spaced perpendicular to one another and with said end pins received in the first of said aperture sets so that said swashplate nonrotatable ring is supported by said control lever end pins;

e. a second torque tube concentric about said axis of rotation with said first torque tube and including a first end of circular cross section positioned concentrically about a second bearing axis which forms an angle with said axis of rotation and passes through said point of intersection;

f. a second bearing member enveloping said first end of said second torque tube and positioned concentrically about said second bearing axis;

g. a second control lever having a circular central opening enveloping said second bearing member so that said second control lever is supported through said second bearing unit by said second torque tube first end and including end pins projecting from the opposite ends thereof concentrically about a second control lever axis which is perpendicular to said first control lever axis and with said end pins received in the second set of apertures of said nonrotatable swashplate member;

h. means to prevent said nonrotatable swashplate member from rotating so that rotation of said first torque tube will cause said nonrotatable swashplate member to tilt about a first tilt axis and thereby vary blade pitch cyclically about said first tilt axis and so that rotation of said second torque tube will cause said nonrotatable swashplate member to tilt about a second tilt axis which is perpendicular to said first tilt axis and thereby vary blade pitch cyclically about said second tilt axis;

i. a rotatable swashplate member supported by and rotatable with respect to said nonrotatable swashplate member; and j. means connecting said rotatable swashplate member to the blades of the rotor for pitch change motion therewith.

2. Apparatus according to claim 1 wherein said rotor has an axis of rotation and wherein said torque tube axis of rotation is coincident with the rotor axis of rotation.

3. Apparatus according to claim 1 and including means to support said torque tubes for translation along and rotation about said axis of rotation.

4. Apparatus according to claim 3 and including means to cause said torque tubes to translate in unison along said axis of rotation and hence to cause said swashplate to so translate to thereby vary the pitch of said blades collectively.

5. Apparatus according to claim 3 and including means to selectively rotate said torque tubes about said axis of rotation individually or in unison to vary the position of said swashplate selectively about each of said tilt axes.

6. Apparatus according to claim 4 and including means to selectively rotate said torque tubes about said axis of rotation individually or in unison to vary the position of said swashplate selectively about each of said tilt axes.

7. A helicopter having a longitudinal and a transverse axis and:

a. a first rotor including a hub mounted for rotation about an axis of rotation and a plurality of blades extending therefrom for rotation therewith and mounted for pitch change motion with respect thereto;

b. a second rotor including a hub mounted for rotation about said axis of rotation and including a plurality of blades mounted for rotation therewith and for pitch change motion with respect thereto;
c. a rotor drive shaft concentric about said axis of rotation and extending through the hub of said second rotor and connected to the hub of said first rotor;
d. means to cause said rotor drive shaft to rotate about said axis of rotation;
e. means to cause said second rotor to rotate about said axis of rotation;
f. means to cause the blades of said second rotor to vary in pitch with respect to the hub thereof; and
g. means to cause blades of said first rotor to vary in pitch with respect to the hub thereof and including;
 1. a first torque tube positioned within said rotor drive shaft and mounted for translation along and rotation about said axis of rotation and having a first end of circular cross section positioned concentrically about a first bearing axis which forms an angle with and intersects said axis of rotation to define a point of intersection therewith,
 2. a first bearing member enveloping said first end of said first torque tube and positioned concentrically about said first bearing axis,
 3. a first control lever including a circular central portion concentrically enveloping said bearing member to be supported therefrom by said first end of said first torque tube and so as to permit rotation therebetween and including end pins projecting from opposite sides thereof concentrically about a first control lever axis passing through said point of intersection,
 4. a swashplate nonrotating ring including two sets of diametrically opposed apertures spaced perpendicular to one another and with said end pins received in the first of said aperture sets so that said swashplate nonrotatable ring is supported by said control lever end pins,
 5. a second torque tube positioned within said rotor shaft and said first torque tube and concentric about said axis of rotation with said first torque tube and mounted for translation along and rotation about said axis of rotation and including a first end of circular cross section positioned concentrically about a second bearing axis which forms an angle with said axis of rotation and passes through said point of intersection,
 6. a bearing member enveloping said first end of said second torque tube and positioned concentrically about said second bearing axis,
 7. a second control lever having a circular central opening enveloping said second bearing member so that said second control lever is supported through said second bearing unit by said second torque tube first end and including end pins projecting from the opposite ends thereof concentrically about a second control lever axis which is perpendicular to said first control lever axis and with said end pins received in the second set of apertures of said nonrotatable swashplate member,
 8. means to prevent said nonrotatable swashplate member from rotating so that rotation of said first torque tube will cause said nonrotatable swashplate member to tilt about a first tilt axis which passes through said point of intersection and which is perpendicular to said axis of rotation when at zero pitch setting, said first bearing axis and said first control lever axis and which is parallel to said helicopter longitudinal axis and thereby vary blade pitch cyclically about said first tilt axis and so that rotation of said second torque tube will cause said nonrotatable swashplate member to tilt about a second tilt axis which is perpendicular to said first tilt axis and is coincident with said first control lever axis and parallel to said helicopter lateral axis and thereby vary blade pitch cyclically about said second tilt axis,
 9. a rotatable swashplate member supported by and rotatable with respect to said nonrotatable swashplate member, and
 10. means connecting said rotatable swashplate member to the blades of the rotor for pitch change motion therewith.

8. Apparatus according to claim 7 and wherein said second rotor blades have pitch change horns projecting therefrom and including means to change the pitch of the blades of said second rotor including:
a. a swashplate mounted for translation and tilting with respect to said axis of rotation;
b. means connecting said swashplate to said pitch change horns; and
c. and servo means in the form of hydraulic cylinder piston units connected to said swashplate to cause said swashplate to translate along and tilt with respect to said axis of rotation.

9. A helicopter including:
a. a helicopter rotor including a hub mounted for rotation about an axis of rotation and including a plurality of blades extending radially therefrom for rotation therewith and mounted for pitch change motion with respect thereto;
b. a transmission unit located in said helicopter and positioned adjacent said rotor;
c. a rotor drive shaft connecting said transmission unit to said helicopter rotor;
d. pitch control means positioned on the opposite side of the rotor from the transmission and including:
 1. a first torque tube positioned concentrically about said axis of rotation and extending through said drive shaft and said rotor hub and mounted for rotation about said axis of rotation and translation therealong and having a first end of circular cross section positioned concentrically about a first bearing axis which forms an angle with and intersects said axis of rotation to define a point of intersection therewith,
 2. a bearing member enveloping said first end of said first torque tube and positioned concentrically about said first bearing axis,
 3. a first control lever including a circular central portion concentrically enveloping said bearing member to be supported therefrom by said first end of said first torque tube and so as to permit rotation therebetween and including end pins projecting from opposite sides thereof concentrically about a first control lever axis passing through said point of intersection,
 4. a swashplate nonrotating ring including two sets of diametrically opposed apertures spaced perpendicular to one another and with said end pins received in the first of said aperture sets so that said swashplate nonrotatable ring is supported by said control lever end pins,
 5. a second torque tube positioned concentrically about said axis of rotation and extending through said first torque tube and mounted for rotation about said axis of rotation and translation therealong and having a first end of circular cross section positioned concentrically about a second bearing axis which forms an angle with said axis of rotation and passes through said point of intersection,
 6. a bearing member enveloping said first end of said second torque tube and positioned concentrically about said second bearing axis,
 7. a second control lever having a circular central opening enveloping said second bearing member so that said second control lever is supported through said second bearing unit by said second torque tube first end and including end pins projecting from the opposite ends thereof concentrically about a second control lever axis which is perpendicular to said first control lever axis and with said end pins received in the second set of apertures of said nonrotatable swashplate member, 8. means to prevent said nonrotatable swashplate member from rotating so that rotation of said first torque will cause said nonrotatable swashplate member to tilt about a first tilt axis and thereby vary blade pitch cyclically about said first tilt axis and so that rotation of said second torque tube will cause said nonrotatable swashplate member to tilt about a second tilt axis which is perpendicular to said first tilt axis and thereby vary blade pitch cyclically about said second tilt axis, 9. a rotatable swashplate member supported by and rotatable with respect to said nonrotatable swashplate member, and 10. means connecting said rotatable swashplate member to the blades of the rotor for pitch change motion therewith.

10. Apparatus according to claim 9 wherein said first ends of said torque tubes, said control levers, and said swashplate are in substantially radial alignment with said axis of rotation.

11. Blade pitch control mechanism for a multibladed rotor of the helicopter-type including:
 a. a first Z-crank mechanism having a tubular center leg mounted for translation along and rotation about an axis of rotation and further having a first end of circular cross section concentric about a first bearing axis forming an angle with said axis of rotation and intersecting the axis of rotation to form a point of intersection;
 b. a first control lever having a circular center aperture in the interior thereof and mounted around said first end of said first Z-crank mechanism to permit relative rotation between said first control lever and said first Z-crank mechanism first end and having end pins projecting from the opposite ends thereof and positioned concentrically about a first control lever axis passing through said point of intersection;
 c. a second Z-crank mechanism including a tubular central leg mounted concentrically with said tubular central leg of said first Z-crank mechanism for translation along and rotation about said axis of rotation and having a first end of circular cross section positioned concentrically about a second bearing axis forming an angle with said axis of rotation and passing through said point of intersection;
 d. a second control lever having a circular aperture in the interior thereof and mounted about said first end of said second Z-crank mechanism to permit relative rotation therebetween and including end pins projecting from the opposite ends thereof and positioned concentrically about a second control lever axis passing through said point of intersection;
 e. a swashplate assembly including:
  1. a nonrotatable ring member having two sets of diametrically opposed apertures therein spaced 90° apart and supported by said control levers with said end pins of said first control lever being received in said first set of apertures and said end pins of said second control lever being received in said second set of apertures, and
  2. a rotatable ring member mounted for rotation and supported from said nonrotatable ring member;
 f. means to prevent rotation of said nonrotatable ring member so that rotation of said tubular leg of said first Z-crank mechanism will cause said nonrotatable swashplate member to tilt about a first tilt axis and thereby vary blade pitch cyclically about said first tilt axis and so that rotation of said tubular leg of said second Z-crank mechanism will cause said nonrotatable swashplate member to tilt about a second tilt axis which is perpendicular to said first tilt axis and thereby vary blade pitch cyclically about said second tilt axis; and
 g. means connecting said rotatable swashplate member to each of the blades to cause the blades to change pitch in accordance with swashplate motion.

12. Apparatus according to claim 11 and including:
 a. means to cause said Z-crank mechanisms to translate in unison along said axis of rotation; and
 b. means to cause said Z-crank mechanisms to rotate about said axis of rotation.

13. Apparatus according to claim 12 wherein said Z-crank mechanisms rotating means includes means to rotate said first Z-crank mechanism and means independent thereof to rotate said second Z-crank mechanism to thereby accomplish universal blade cyclic pitch variation.